United States Patent
Thomas et al.

(10) Patent No.: US 12,353,003 B2
(45) Date of Patent: Jul. 8, 2025

(54) PHOTONIC MODULE AND METHOD OF MANUFACTURE

(71) Applicant: ROCKLEY PHOTONICS LIMITED, Cheshire (GB)

(72) Inventors: Abu Thomas, Simi Valley, CA (US); Andrea Trita, Pasadena, CA (US); Yangyang Liu, Glendale, CA (US); Andrew George Rickman, Marlborough (GB)

(73) Assignee: Rockley Photonics Limited, Altrincham (GB)

( * ) Notice: Subject to any disclaimer, the term of this patent is extended or adjusted under 35 U.S.C. 154(b) by 323 days.

(21) Appl. No.: 17/798,525

(22) PCT Filed: Feb. 10, 2021

(86) PCT No.: PCT/EP2021/053237
§ 371 (c)(1),
(2) Date: Aug. 9, 2022

(87) PCT Pub. No.: WO2021/160690
PCT Pub. Date: Aug. 19, 2021

(65) Prior Publication Data
US 2023/0125733 A1 Apr. 27, 2023

Related U.S. Application Data

(60) Provisional application No. 62/975,111, filed on Feb. 11, 2020.

(51) Int. Cl.
*G02B 6/12* (2006.01)
*G02B 6/122* (2006.01)
(Continued)

(52) U.S. Cl.
CPC .......... *G02B 6/12002* (2013.01); *G02B 6/12* (2013.01); *G02B 6/12004* (2013.01);
(Continued)

(58) Field of Classification Search
CPC .............. G02B 6/1228; G02B 6/12002; G02B 6/12004; G02B 6/125; G02B 2006/12061;
(Continued)

(56) References Cited

U.S. PATENT DOCUMENTS 4,472,020 A * 9/1984 Evanchuk ................ B05D 3/06
385/47
6,674,950 B2 * 1/2004 Yang ..................... G02B 6/4202
385/129

(Continued)

FOREIGN PATENT DOCUMENTS

CN 102944912 A * 2/2013
JP 05-216079 A * 8/1993
(Continued)

OTHER PUBLICATIONS

Abe et al., Machine Translation of JP 05-216079 A, Aug. 27, 1993. (Year: 1993).*
(Continued)

*Primary Examiner* — Michelle R Connelly
(74) *Attorney, Agent, or Firm* — Womble Bond Dickinson (US) LLP

(57) ABSTRACT

A photonic module, comprising a first waveguide; a second waveguide, disposed on an opposing side of the first waveguide to a substrate; and, a coupling section. One of the first waveguide and the second waveguide is formed of crystalline silicon. The other of the first waveguide and the second waveguide is formed of amorphous silicon. The coupling section is configured to couple light between the first waveguide and the second waveguide. Such a silicon photonic
(Continued)

module has enhanced coupling and transmission properties in contrast to conventional modules.

13 Claims, 6 Drawing Sheets

(51) Int. Cl.
  *G02B 6/125* (2006.01)
  *G02B 6/136* (2006.01)
(52) U.S. Cl.
  CPC ......... *G02B 6/12016* (2013.01); *G02B 6/122* (2013.01); *G02B 6/1228* (2013.01); *G02B 6/125* (2013.01); *G02B 6/136* (2013.01); *G02B 6/12011* (2013.01); *G02B 2006/12038* (2013.01); *G02B 2006/12061* (2013.01); *G02B 2006/12147* (2013.01); *G02B 2006/12159* (2013.01); *G02B 2006/12164* (2013.01); *G02B 2006/12176* (2013.01)
(58) Field of Classification Search
  CPC .......... G02B 6/305; G02B 2006/12147; G02B 6/14; G02B 6/136; G02B 2006/12097; G02B 6/13; G02B 2006/12152; G02B 6/26; G02B 6/122; G02B 2006/121; G02B 2006/12195; G02F 1/025; G02F 1/212
  See application file for complete search history.

(56) References Cited

U.S. PATENT DOCUMENTS

| | | | | |
|---|---|---|---|---|
| 9,435,946 | B2* | 9/2016 | Sakakibara | G02B 6/12002 |
| 9,746,607 | B2* | 8/2017 | Collins | G02B 6/1228 |
| 10,096,971 | B2* | 10/2018 | Dong | H01S 3/0637 |
| 10,345,521 | B2* | 7/2019 | Li | G02B 6/132 |
| 2004/0037497 | A1* | 2/2004 | Lee | G02B 6/132 385/28 |
| 2009/0297093 | A1* | 12/2009 | Webster | G02B 6/1228 264/1.25 |
| 2010/0040327 | A1* | 2/2010 | Deki | G02B 6/305 385/28 |
| 2012/0207424 | A1* | 8/2012 | Zheng | G02F 1/01708 385/2 |
| 2012/0224813 | A1* | 9/2012 | Chen | G02B 6/1228 29/874 |
| 2013/0285184 | A1* | 10/2013 | Li | H01L 31/105 438/69 |
| 2013/0336346 | A1* | 12/2013 | Kobrinsky | G02B 6/1228 372/50.21 |
| 2016/0274438 | A1* | 9/2016 | Shimizu | G02F 1/3137 |
| 2017/0139142 | A1* | 5/2017 | Patel | G02B 6/12004 |
| 2017/0139146 | A1* | 5/2017 | Novack | G02B 6/29332 |
| 2019/0330482 | A1* | 10/2019 | Williams | C09D 11/00 |
| 2020/0124795 | A1* | 4/2020 | Cherchi | G02B 6/1228 |

FOREIGN PATENT DOCUMENTS

| | | | |
|---|---|---|---|
| JP | 2012022079 A | * | 2/2012 |
| JP | 5685843 B2 | * | 3/2015 |
| JP | 2018040829 A | * | 3/2018 |
| WO | WO 2018/193167 A1 | | 10/2018 |

OTHER PUBLICATIONS

Fujioka et al., Machine Translation of JP 2012-022079 A, Feb. 2, 2012. (Year: 2012).*

Ito et al., Machine Translation of JP 2018-040829 A, Mar. 15, 2018. (Year: 2018).*

JP 5685843 B2, Machine Translation, Mar. 18, 2015. (Year: 2015).*

Chu et al., Machine translation of CN-102944912-A, Feb. 27, 2013. (Year: 2013).*

International Search Report of PCT/EP2021/053237, May 12, 2021, 4 pages.

Written Opinion of International Searching Authority for PCT/EP2021/053237, May 12, 2021, 6 pages.

Itoh, et al., "Crystalline/Amorphous Si Integrated Optical Couplers for 2D/3D Interconnection", May 13, 2016, vol. 22, No. 6, p. 1-9.

Sun, et al., "Impedance matching vertical optical waveguide couplers for dense high index contrast circuits", Optics Express, vol. 16, No. 16, Aug. 4, 2008, p. 11682-11690.

Jones, et al., "Ultra-low crosstalk, CMOS compatible waveguide crossings for densely integrated photonic interconnection networks", Optics Express, vol. 21, No. 10, May 9, 2013, p. 12002-12013.

Chiles, J. et al., "Multi-planar amorphous silicon photonics with compact interplanar couplers, cross talk mitigation, and low crossing loss", APL Photonics, Oct. 11, 2017, pp. 116101-1 through 116101-7, AIP Publishing.

U.K. Intellectual Property Office Search and Examination Report, dated Sep. 20, 2021 for Patent Application No. GB2101827.0, 11 pages.

U.K. Intellectual Property Office Examination Report, dated Sep. 28, 2022 for Patent Application No. GB2101827.0, 3 pages.

U.K. Intellectual Property Office Examination Report, dated Jul. 5, 2022 for Patent Application No. GB2101827.0, 5 pages.

* cited by examiner

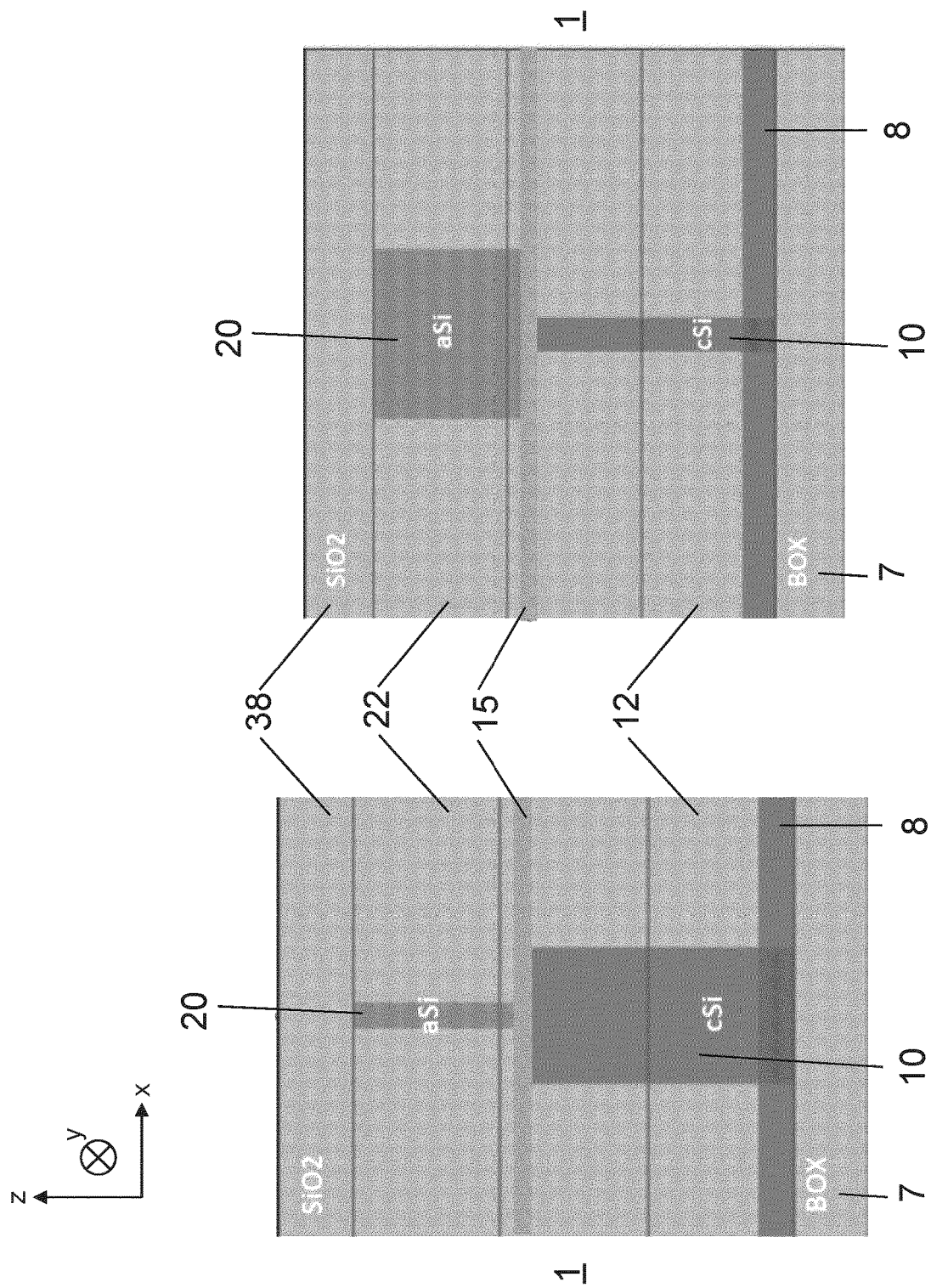

PHOTONIC MODULE AND METHOD OF MANUFACTURE

CROSS-REFERENCE TO RELATED APPLICATION(S)

This application is a U.S. national stage entry, under 35 U.S.C. § 371, of International Application Number PCT/EP2021/053237, filed on Feb. 10, 2021, which claims priority to and the benefit of U.S. Provisional Application No. 62/975,111, filed Feb. 11, 2020. The entire contents of all of the applications identified in this paragraph are incorporated herein by reference.

FIELD OF THE INVENTION

The present invention relates to a photonic module and corresponding method of manufacture.

BACKGROUND

Conventional photonic modules may include an amorphous silicon waveguide in conjunction with a crystalline silicon component. The amorphous silicon waveguide is typically fabricated via a three-stage process: (1) plasma enhanced chemical vapour deposition, PECVD, of amorphous silicon in a cavity, where the cavity is formed by performing an etch on a silicon-on-insulator substrate, SOI; (2) chemical mechanical polishing, CMP, to obtain a uniform topography and a height equal to that of the SOI; and, (3) lithography and etching to produce an amorphous silicon strip waveguide.

However, such photonic modules, and the corresponding method of manufacture, have a number of disadvantages. Firstly, PECVD in a cavity results in two different growth-fronts; vertical, starting from the bed of the cavity, and horizontal, starting from the sidewalls of the cavity. These vertical and horizontal growth-fronts meet along a diagonal surface, which creates voids. Such voids are particularly undesirable because they act as scattering centres, which leads to significant optical insertion losses. Voids are also produced at the amorphous-crystalline interface.

Further, CMP is a challenging process, the control of which affects overall optical performance. In particular, non-ideal CMP, in which too much or too little amorphous silicon is removed, results in a step topology at the amorphous-crystalline interface instead of a flat surface. This leads to insertion loss and undesirable higher-order mode, HOM, excitation. Non-ideal CMP also causes dishing, i.e., the thickness of the amorphous silicon waveguide varies continuously along the propagation direction, where the amorphous silicon is thinnest at the centre of the cavity and thickest at the interface. Dishing leads to birefringence which is undesirable because the optical performance will then be polarisation dependent.

There is therefore a need for an improved photonic module and corresponding method of manufacture.

SUMMARY

Accordingly, in a first aspect, embodiments of the present invention provide a photonic module comprising: a first waveguide; a second waveguide, disposed on an opposing side of the first waveguide to a substrate; and, a coupling section; wherein one of the first waveguide and the second waveguide is formed of crystalline silicon; the other of the first waveguide and the second waveguide is formed of amorphous silicon; and, the coupling section is configured to couple light between the first waveguide and the second waveguide.

Such a silicon photonic module has enhanced coupling and transmission properties in contrast to conventional modules. Notably, the photonic module provides an escalator scheme which can vertically couple light up into the second waveguide. Moreover, specific optical modes can be coupled across a broad wavelength range.

The photonic module may have any one, or any combination insofar as they are compatible, of the following optional features.

The photonic module can be implemented in both large waveguide and small waveguide platforms. For example, the photonic module can be implemented in a 3 µm waveguide platform, or a 0.3 µm waveguide platform.

The substrate may define a horizontal plane, the first waveguide may be positioned above the substrate, and the second waveguide may be positioned above the first waveguide. In this way, the first waveguide is located between the second waveguide and the substrate.

The coupling section may comprise a tapered portion of at least one of the first waveguide and the second waveguide. The tapered portion corresponds to a reduction in width from a first value to a second value in a direction parallel or substantially parallel to the respective waveguide, wherein the width is a transverse width. In this way, by spatially compressing the optical modes propagating through the at least one of the waveguides, the tapered portion induces an efficient transfer of optical power between the waveguides. Accordingly, the tapered portion facilitates efficient evanescent coupling. The thickness and width of the second waveguide may be chosen so that a phase-matching point exists along the coupling section.

The coupling section may comprise a tapered portion of the first waveguide, tapering from a first width to a second width along a first direction, and a tapered portion of the second waveguide, tapering from a first width to a second width along a second direction; wherein the first direction and second direction are antiparallel or substantially antiparallel. By substantially antiparallel, it may be meant that an angle between vectors describing the two directions may be $180°\pm0.5°$, $\pm1°$, $\pm2°$, or $\pm5°$. In this way, a narrowed portion, having the second width, of the first waveguide is aligned with a non-tapered portion of the second waveguide (i.e. a portion having the first width), and a narrowed portion, having the second width, of the second waveguide is aligned with a non-tapered portion of the first waveguide (i.e. a portion having the first width). Accordingly, the coupling section is configured to induce an efficient transfer of optical power from the first waveguide to the second waveguide, and vice versa. The photonic module is bidirectional.

The first width along the first direction, may be equal to, or different to, the first width along the second direction. Similarly, the second width along the first direction, may be equal to, or different to, the second width along the second direction.

The photonic module may further comprise a first cladding disposed so as to at least partially surround the first waveguide and a second cladding disposed so as to at least partially surround the second waveguide. In this way, the photonic module has improved efficiency due to a reduction in optical losses. Preferably, the first cladding and the second cladding are formed of silicon dioxide, which has a lower refractive index than the silicon waveguide components; accordingly, optical leakage is reduced.

A length of the coupling section may be greater than a maximum transverse width of the first waveguide and a maximum transverse width of the second waveguide. The length of the coupling section may be more than 3 µm, for example at least 4 µm. The length of the coupling section may be no more than 10 µm. The maximum transverse widths may be at least 2 µm. The maximum transverse widths may be no more than 4 µm. In this way, the coupling section is adiabatic.

In other examples, the length of the coupling section may be the same as or smaller than a maximum transverse width of the first waveguide and a maximum transverse width of the second waveguide.

The photonic module may further comprise an intermediary layer disposed in-between the first waveguide and the second waveguide. In this way, the second waveguide is disposed on the intermediary layer. The intermediary layer may be formed of silicon oxide. The intermediary layer may be at most 100 nm tall (i.e. as measured from the top of the first waveguide to the bottom of the second waveguide).

The first waveguide may have a port or facet, through which light is received or transmitted, which is around 3 µm wide. The second waveguide may have a port or facet, through which light is received or transmitted, which is around 3 µm wide. The port or facet in the first waveguide may be an input port, in that it is configured to receive light and transmit it to the coupling region. The port or facet in the second waveguide may be an output port, in that it is configured to transmit light received from the coupling region out of the photonic module.

The substrate may comprise a buried oxide, BOX, layer. The substrate may further comprise a silicon substrate layer, located on an opposing side of the buried oxide layer to the first waveguide.

The first waveguide may be formed of crystalline silicon and the second waveguide may be formed of amorphous silicon. Alternatively, the first waveguide may be formed of amorphous silicon and the second waveguide may be formed of crystalline silicon.

The photonic module may further comprise an additional silicon dioxide cladding layer disposed on an opposing side of the second waveguide to the first waveguide. In this way, optical leakage is further reduced.

The photonic module may further comprise a third waveguide and a second coupling section, wherein the second coupling section is configured to couple light between the second waveguide and the third waveguide. The second waveguide may be disposed on an opposing side of the third waveguide to the substrate.

The third waveguide may be positioned on the same horizontal plane as the first waveguide. Alternatively, the third waveguide may be disposed on an opposing side of the second waveguide to the first waveguide. The first waveguide and the third waveguide may be formed of crystalline silicon, and the second waveguide may be formed of amorphous silicon. In this way, the photonic module may couple light from crystalline silicon into amorphous silicon, and back into crystalline silicon. Alternatively, the first waveguide and the third waveguide may be formed of amorphous silicon, and the second waveguide may be formed of crystalline silicon. In this way, the photonic module may couple light from amorphous silicon into crystalline silicon, and back into amorphous silicon.

The third waveguide may include any one, or any combination insofar as they are compatible, of the optional features of the first waveguide.

The second coupling section may include any one, or any combination insofar as they are compatible, of the optional features of the first coupling section.

In a second aspect, embodiments of the invention provide a component including the photonic module of the first aspect, wherein the component includes one or more crossing waveguides, a portion of the or each crossing waveguides being located between the second waveguide and the substrate; and the crossing waveguides are optically insulated from the waveguides of the photonic module. In this way, the component facilitates simultaneous power transmission via the photonic module, as well as via the crossing waveguides. Accordingly, multi-directional power transmission is facilitated; for example, the one or more crossing waveguides may be angled relative to the photonic module.

The photonic module as used in the second aspect may include any one, or any combination insofar as they are compatible, of the optional features of the photonic module of the first aspect.

In a third aspect, embodiments of the invention provide a Mach-Zender Interferometer, MZI, having two arms, at least one of the arms comprising at least one photonic module of the first aspect. The photonic module as used in the third aspect may include any one, or any combination insofar as they are compatible, of the optional features of the photonic module of the first aspect.

In a fourth aspect, embodiments of the invention provide an arrayed waveguide grating, AWG, the AWG including a plurality of output or input waveguides, at least one of the output or input waveguides comprising a photonic module of the first aspect. The photonic module of the fourth aspect may include any one, or any combination insofar as they are compatible, of the optional features of the photonic module of the first aspect.

Accordingly, the photonic module introduces a path-length imbalance between the two arms of the MZI, or between the plurality of output or input waveguides of the AWG. Further, the MZI or AWG may couple light from crystalline silicon to amorphous silicon and back into crystalline silicon, or, couple light from amorphous silicon to crystalline silicon and back into amorphous silicon.

According to a fifth aspect, embodiments of the invention provide a method of fabricating a photonic module on a substrate, the method including: performing a first etching process on a first layer to form a first waveguide; depositing a second layer on an opposing side of the first waveguide to a substrate; and performing a second etching process on the second layer to form a second waveguide; wherein: the steps of performing the first etching process and/or the second etching process also form a coupling section for coupling light between the first waveguide and the second waveguide; one of the first layer and the second layer is formed of crystalline silicon; and the other of the first layer and the second layer is formed of amorphous silicon.

The method advantageously results in a photonic module having enhanced coupling and transmission properties.

The method may include a step, performed before etching the first layer, of depositing the first layer on the substrate. The method may be performed on a silicon-on-insulator wafer, wherein the first layer is provided by the silicon device or silicon-on-insulator layer.

The step of performing the first etching process may also form a tapered portion of the first waveguide, the coupling section comprising the tapered portion of the first waveguide.

The step of performing the second etching process may also form a tapered portion of the second waveguide, the coupling section comprising the tapered portion of the second waveguide.

The step of performing the first etching process may also form a tapered portion of the first waveguide, the tapered portion tapering from a first width to a second width along a first direction and the coupling section comprising the tapered portion of the first waveguide; and the step of performing the second etching process may also form a tapered portion of the second waveguide, the tapered portion tapering from a first width to a second width along a second direction and the coupling section further comprising the tapered portion of the second waveguide; such that the first direction and second direction are antiparallel or substantially antiparallel. By substantially antiparallel, it may be meant that an angle between vectors describing the two directions may be 180°±0.5°, ±1°, ±2°, or ±5°.

In this way, no cavity etch or CMP is required. The second waveguide may be blanket-deposited on the opposing side of the first waveguide to the substrate, instead of over a cavity. Since there is no CMP, CMP-associated problems are also eliminated. Also since multiple growth-fronts are eliminated, voids or seams detrimental to optical performance are avoided.

One or more etches within the first etching process and/or the second etching process may be performed anisotropically.

The first etching process may include an initial step of applying a first mask to the first layer; and the second etching process may include an initial step of applying a second mask to the second layer.

The method further includes depositing a first cladding so as to at least partially surround the first waveguide; and depositing a second cladding so as to at least partially surround the second waveguide. In this way, the photonic module has improved efficiency due to a reduction in optical loss. The first cladding and the second cladding may be formed of silicon dioxide. The silicon dioxide has a lower refractive index than the silicon waveguide components. Accordingly, optical leakage is reduced.

The step of depositing the second layer may further include an initial step of depositing an intermediary layer on an opposing side of the first waveguide to the substrate. The intermediary layer may be formed of silicon oxide. In this way, the second layer is blanket-deposited on the intermediary layer of silicon oxide, instead of a cavity. Accordingly, void formation is avoided.

The substrate may comprise a buried oxide, BOX, layer. The substrate may further comprise a silicon substrate layer, located on an opposing side of the buried oxide layer to the first waveguide.

The first waveguide may be formed of crystalline silicon and the second waveguide may be formed of amorphous silicon.

Alternatively, the first waveguide may be formed of amorphous silicon and the second waveguide may be formed of crystalline silicon.

The method may further include depositing an additional silicon dioxide cladding layer on an opposing side of the second waveguide to the first waveguide.

In a sixth aspect, embodiments of the present invention provide a waveguide structure, comprising:
a first waveguide on a substrate; and
a second waveguide on the substrate,
the first waveguide and the second waveguide each being substantially parallel to the substrate,
the first waveguide being at a different height than the second waveguide, and
the waveguides being configured to cause light propagating in the first waveguide to couple into the second waveguide.

The waveguide structure of the sixth aspect, including at least the first waveguide, second waveguide, and substrate, may have any one, or any combination of the optional features as set out with reference to the first aspect.

Further aspects of the present invention provide: a computer program comprising code which, when run on a computer, causes the computer to perform the method of the fifth aspect; a computer readable medium storing a computer program comprising code which, when run on a computer, causes the computer to perform the method of the fifth aspect; and a computer system programmed to perform the method of the fifth aspect.

BRIEF DESCRIPTION OF THE DRAWINGS

Embodiments of the invention will now be described by way of example with reference to the accompanying drawings in which:

FIG. 2A illustrates a cross-sectional view of the photonic module of FIG. 1;

FIG. 2B illustrates a cross-sectional view of the photonic module of FIG. 1;

DETAILED DESCRIPTION AND FURTHER OPTIONAL FEATURES

Aspects and embodiments of the present invention will now be discussed with reference to the accompanying figures. Further aspects and embodiments will be apparent to those skilled in the art.

Figure 1:
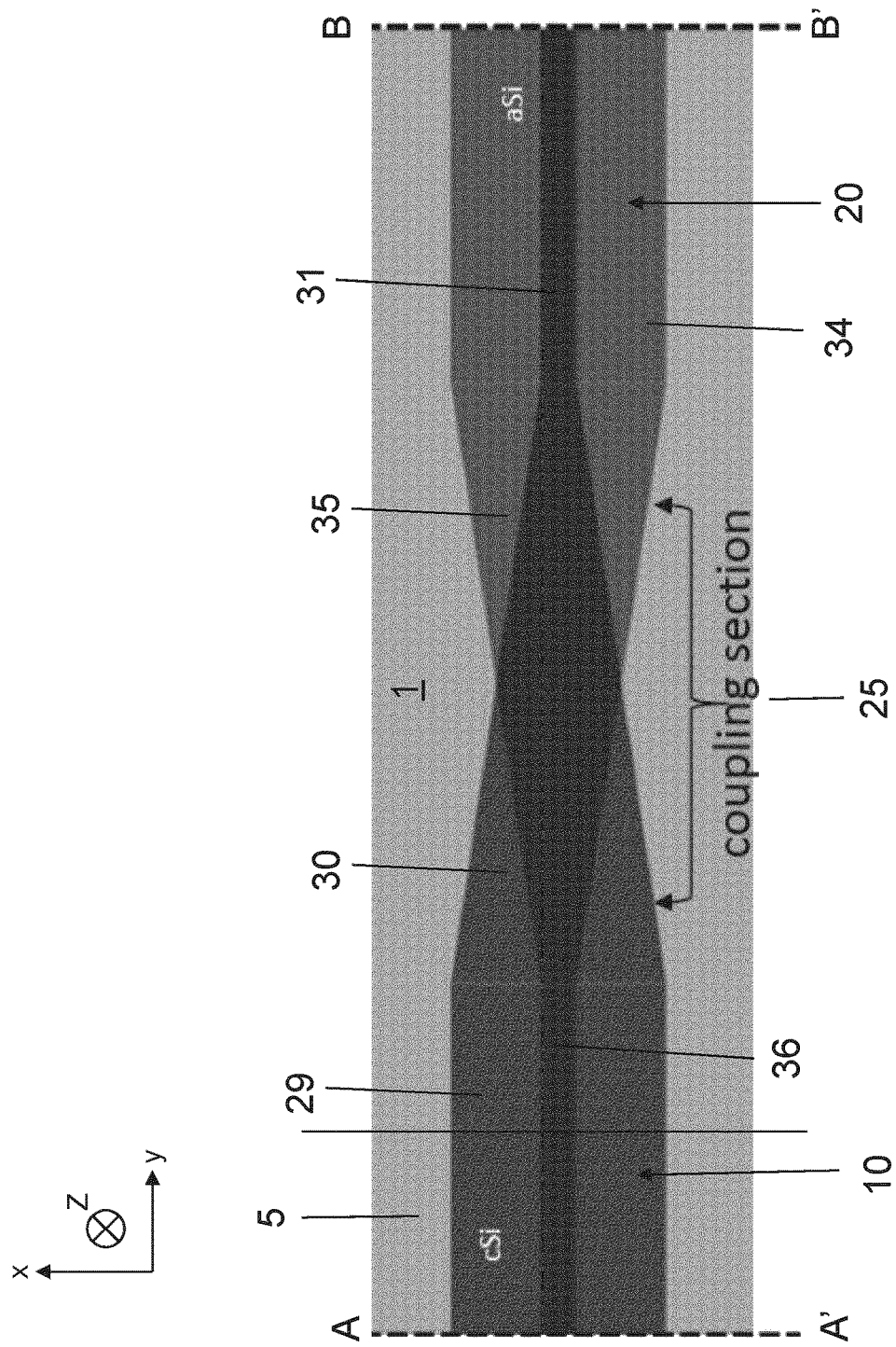
FIG. 1 shows a top-down schematic view of a photonic module in accordance with an embodiment of the present invention.

FIG. 1 illustrates a top-down schematic view of a photonic module 1. The photonic module 1 includes a substrate 5, on which a first waveguide 10 is disposed. A second waveguide 20 is disposed on an opposing side of the first waveguide 10 to the substrate 5, i.e., above the first waveguide 10 and the substrate 5 in the 'z' direction. The photonic module 1 also includes a coupling section 25 for coupling light between the first waveguide 10 and the second waveguide 20. The coupling section 25 comprises a tapered portion 30 of the first waveguide, tapering from a first width to a second width along a first direction, and a tapered portion 35 of the second waveguide, tapering from a first width to a second width along a second direction. The tapered portion 30 extends between a non-tapered portion 29, having the first width, and a narrowed portion 31 of the first waveguide 10, having the second width. Similarly, the tapered portion 35 extends between a non-tapered portion 34, having the first width, and a narrowed portion 36 of the second waveguide 20, having the second width. In this example, the first direction and the second direction are antiparallel. Alternatively, the first direction and the second direction may be substantially antiparallel. By substantially antiparallel, it may be meant that an angle between vectors describing the two directions may be 180°±0.5°, ±1°, ±2°, or ±5°. As such, the narrowed portion 31 of the first waveguide is aligned with the non-tapered portion 34 of the second waveguide, and the narrowed portion 36 of the second waveguide is aligned with the non-tapered portion 29 of the first waveguide. The photonic module 1 is bidirectional; the coupling section 25 induces an efficient transfer of optical power from the first waveguide 10 to the second waveguide 20, and vice versa.

As shown in FIG. 1, the first width along the first direction is equal to the first width along the second direction. That is to say, the first and second waveguide have the same first width and same second width. In an alternative, not shown, the first and second waveguides have respectively different first widths and/or respectively different second widths.

The length of the coupling section 25 is greater than a maximum transverse width of the first waveguide 10 and a maximum transverse width of the second waveguide 20. Accordingly, the length of the coupling section 25 is greater than the transverse widths of the non-tapered portion 29 of the first waveguide 10 and the non-tapered portion 34 of the second waveguide 20. The length of the coupling section may be at least 4 μm but no more than 10 μm, and the maximum transverse widths may be at least 2 μm but no more than 4 μm. Accordingly, the photonic module is dimensioned such that the coupling section is adiabatic.

FIG. 2A illustrates a cross-sectional view of the photonic module 1, along the line A-A' in FIG. 1 wherein the cross-section intersects the non-tapered portion 29 of the first waveguide and the narrowed portion 36 of the second waveguide. Similarly, FIG. 2B illustrates a cross-sectional view of the photonic module 1, along the line B-B' in FIG. 1 wherein the cross-section intersects the narrowed portion 31 of the first waveguide and the non-tapered portion 34 of the second waveguide.

As depicted in FIGS. 2A and 2B, a first cladding 12, of equal height to the first waveguide 10, is disposed adjacent to the first waveguide 10, so as to at least partially surround the first waveguide 10. A second cladding 22, of equal height to the second waveguide 20, is disposed adjacent to the second waveguide 20, so as to at least partially surround the second waveguide 20. The first cladding 12 and the second cladding 22 are formed of silicon dioxide for reducing optical leakage. An additional silicon dioxide cladding layer 38 is disposed on the upper surfaces of the second waveguide 20 and the second cladding 22. In this example, the first waveguide is a rib waveguide in that the optical mode is chiefly confined to the upstanding rib portion 10 and does not leak into the silicon device layer 8. In an alternative example, the first waveguide is a ridge waveguide, and the optical mode is contained in both an upstanding ridge portion and a corresponding slab portion of the waveguide.

An intermediary layer 15 is disposed in between the first waveguide 10 and the second waveguide 20. The intermediary layer 15 also separates the first cladding 12 and the second cladding 22. The intermediary layer 15 is of uniform thickness and is bound between a first planar surface, defined by the first waveguide 10 and the first cladding 12, and a second planar surface, defined by the second waveguide 20 and the second cladding 22. The intermediary layer 15 is formed of silicon oxide. In this example, the intermediary layer 15 is at most 100 nm tall (i.e. as measured from the top of the first waveguide 10 to the bottom of the second waveguide 20).

The substrate includes a buried oxide, BOX, layer 7, on which a silicon device layer 8 is disposed. In turn, the first waveguide is disposed on the silicon device layer 8. The first waveguide 10 is formed of crystalline silicon, and the second waveguide 20 is formed of amorphous silicon. Below the buried oxide layer there may be a silicon substrate layer.

Figure 3A:
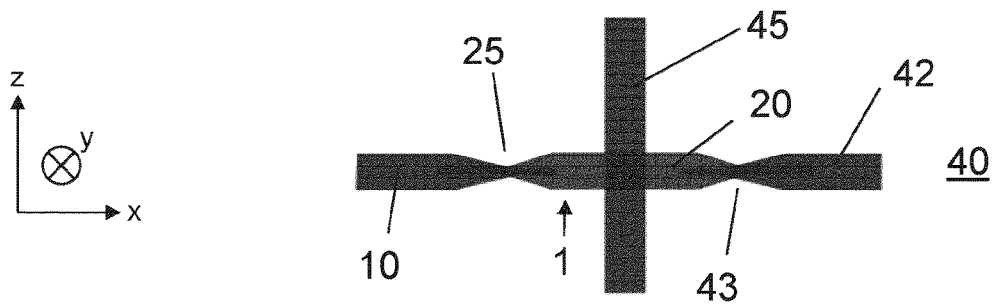
FIG. 3A illustrates a component in accordance with an embodiment of the present invention.

FIG. 3A illustrates a component 40 comprising a photonic module 1 having a third waveguide 42 and a second coupling section 43. The second coupling section 43 is configured to couple light between the second waveguide 20 and the third waveguide 42. The second coupling section 43 is a mirror image of the first coupling section 25 reflected about the z-y plane.

The second waveguide 20 is disposed on an opposing side of the third waveguide 42 to the substrate 5. The third waveguide 42 is positioned on the same horizontal plane as the first waveguide 10. Alternatively, the third waveguide 42 may be disposed on an opposing side of the second waveguide 20 to the first waveguide 10. The component 40 includes a crossing waveguide 45, a portion of which is located between the second waveguide 20 and the substrate 5. The crossing waveguide 45 is optically insulated from the first waveguide 10, the second waveguide 20 and the third waveguide 42 of the photonic module 1. The second waveguide 20 forms a bridge-like structure over the crossing waveguide 45. The crossing waveguide 45 is straight and extends perpendicular to a longitudinal axis of the photonic module 1. The component may form a portion of a photonic integrated circuit (PIC).

Figure 3B:
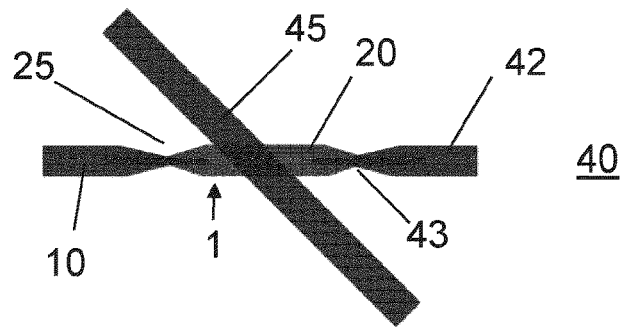
FIG. 3B illustrates an alternative configuration of the component of FIG. 3A.

FIG. 3B illustrates an alternative example of the component 40, wherein the crossing waveguide 45 is angled relative to the longitudinal axis of the photonic module 1. Like features are indicated by like reference numerals.

Figure 3C:
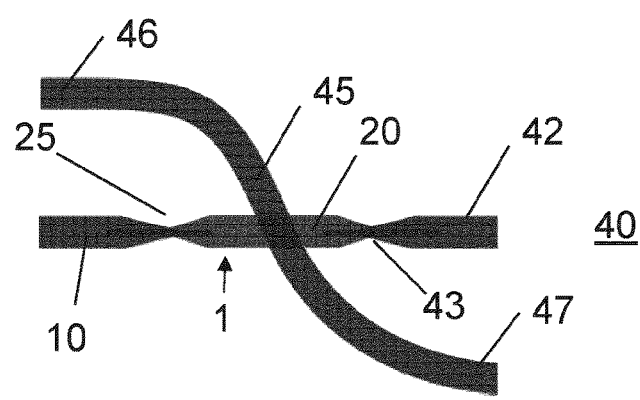
FIG. 3C illustrates yet another configuration of the component of FIG. 3A.

FIG. 3C illustrates yet another example of the component 40, wherein the crossing waveguide 45 intersects the longitudinal axis of the photonic module 1 at a non-zero angle, but the crossing waveguide is curved such that a first end 46 and a second end 47 extend parallel to the longitudinal axis of the photonic module 1. Like features are indicated by like reference numerals.

Figure 3D:
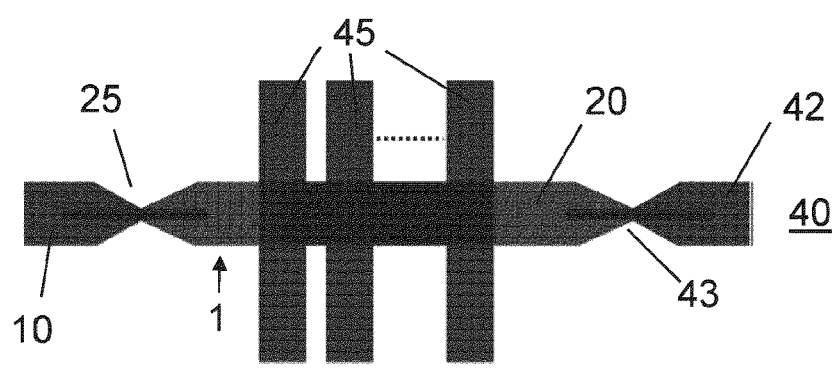
FIG. 3D illustrates a further configuration of the component of FIG. 3A.

FIG. 3d illustrates a further example of the component 40, wherein the component includes more than one crossing waveguide 45. Like features are indicated by like reference numerals.

Figure 4:
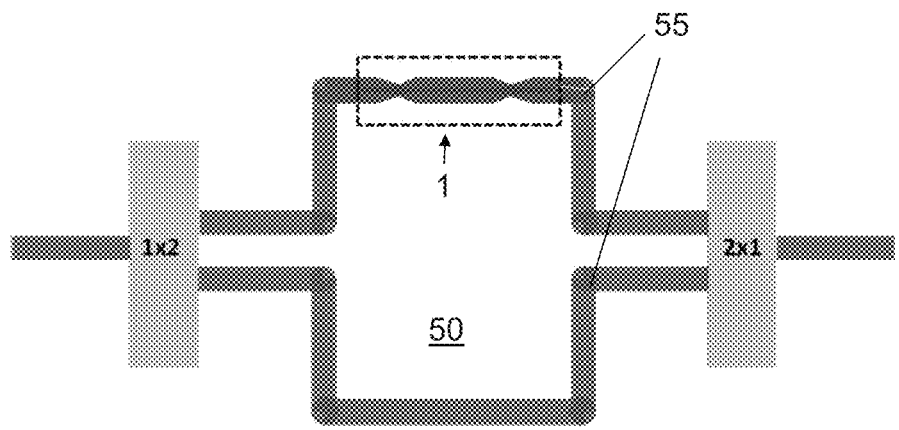
FIG. 4 illustrates an MZI in accordance with an embodiment of the present invention.

FIG. 4 illustrates a Mach-Zehnder interferometer (MZI) 50 having two arms 55. One of the arms 55 includes a photonic module 1 to introduce a path-length imbalance between the two arms 55. The photonic module 1 facilitates a thermal performance of the MZI 50.

Figure 5:
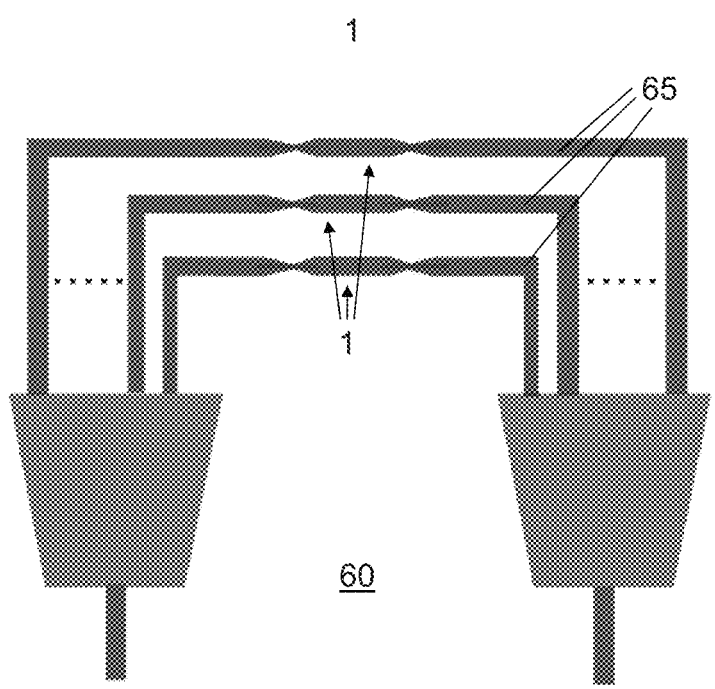
FIG. 5 illustrates an AWG in accordance with an embodiment of the present invention.

FIG. 5 illustrates an arrayed waveguide grating (AWG) 60 having multiple output/input waveguides 65. Each of the output/input waveguides includes a photonic module 1 to introduce a path-length imbalance between the output/input waveguides 65. The AWG 60 facilitates transmission in a first direction via the photonic modules 1, and transmission in a second direction via the output/input waveguides 65, which may be regular silicon waveguides. The first and second directions are perpendicular or substantially perpendicular. The photonic module 1 facilitates a thermal performance of the AWG 60.

Figure 6A:
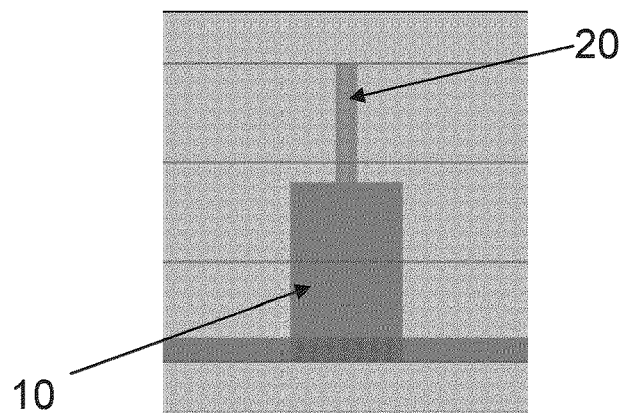
FIG. 6A illustrates a cross-sectional view of the photonic module of FIG. 1.

FIG. 6A depicts an input port of the first waveguide 10, through which light is received. The input port is around 3 μm wide and is configured to receive light and transmit it to the coupling section 25. In another example, the first waveguide 10 has an output port, through which light is transmitted, which is around 3 μm wide and is configured to transmit light received from the coupling section out of the photonic module.

Figure 6B:
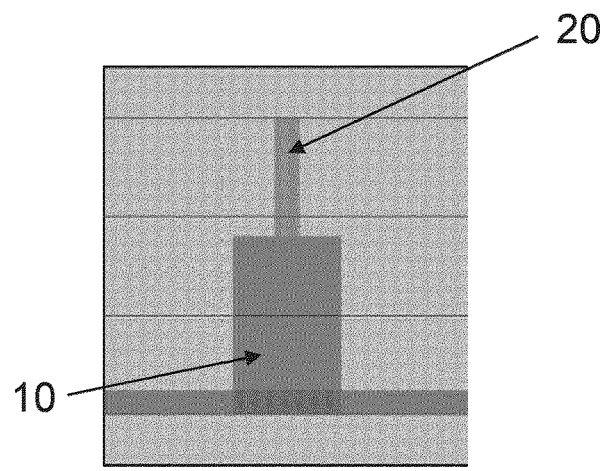
FIG. 6B illustrates a cross-sectional view of the photonic module of FIG. 1.

The thickness and width of the second waveguide 20 is chosen so that a phase matching point exists along the coupling section 25. FIG. 6B depicts a cross-sectional view of a phase matching point.

Figure 6C:
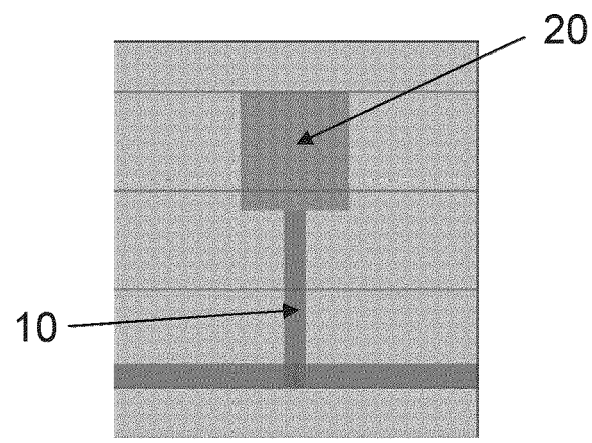
FIG. 6C illustrates a cross-sectional view of the photonic module of FIG. 1.

FIG. 6C depicts an output port of the second waveguide 20, through which light is transmitted. The output port is around 3 μm wide and is configured to transmit light received from the coupling region out of the photonic module. In another example, the second waveguide 20 has an input port, through which light is received, which is around 3 μm wide and is configured to receive light and transmit it to the coupling region 25.

Figure 7A:
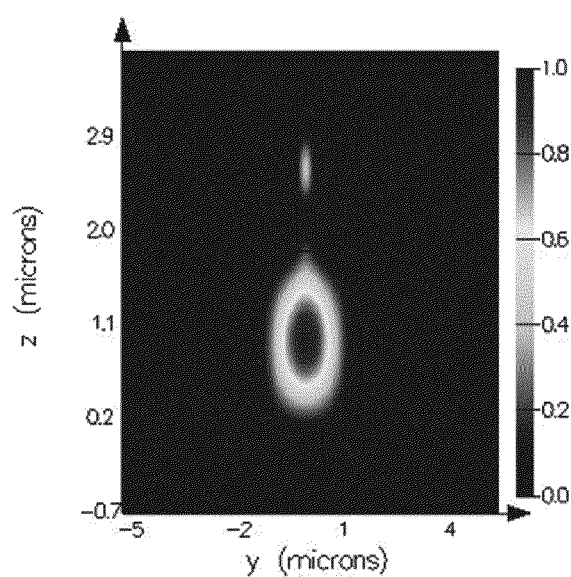
FIG. 7A depicts simulation results of the photonic module at the cross-section as depicted in FIG. 6A.

FIG. 7A depicts the optical mode at the input port of FIG. 6A; the optical mode is concentrated in the region corresponding to the first waveguide 10. FIG. 7C depicts the optical mode at the output port of 7C after it has passed through the coupling region; the optical mode is concentrated in the region corresponding to the second waveguide 20.

Figure 7B:
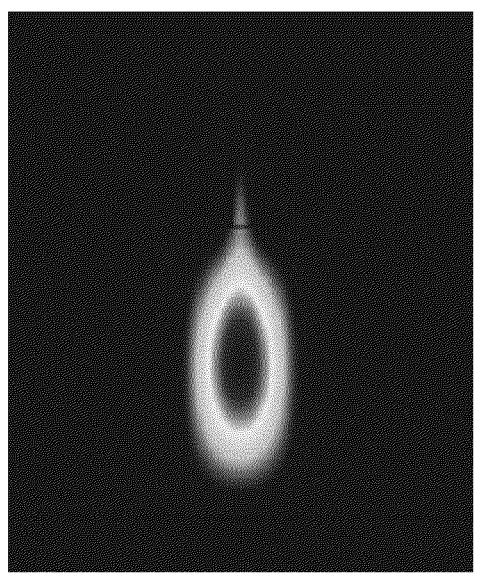
FIG. 7B depicts simulation results of the photonic module at the cross-section as depicted in FIG. 6B.
Figure 7C:
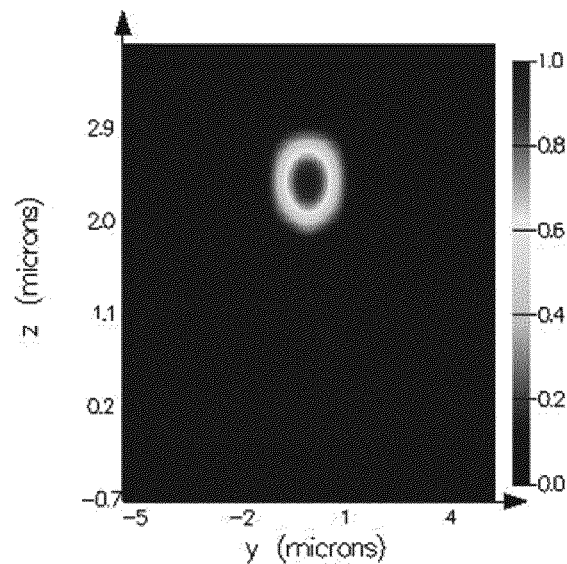
FIG. 7C depicts simulation results of the photonic module at the cross-section as depicted in FIG. 6C.

FIG. 7B depicts the optical mode at the phase matching point of FIG. 6B.

The photonic module 1 is fabricated either by depositing a first layer on the substrate 5, the substrate 5 includes a buried oxide, BOX, layer 7 or by providing a silicon-on-insulator wafer, the silicon device layer of the wafer providing the first layer. The first layer may be formed of either crystalline silicon (e.g. in the case of an SOI wafer) or amorphous silicon (e.g. in the case of depositing a first layer). Next, a first mask is applied to the first layer. This can be performed via photolithography. The first mask is either dimensioned or etched so as to cover a portion of the first layer corresponding to the desired shape of the first waveguide 10. A first etch is then performed to produce the first waveguide 10, which includes a tapered portion 30. The tapered portion 30 extends between a non-tapered portion 29 and a narrowed portion 31 of the first waveguide 10. An anisotropic etch may be used when performing the first etch.

A first cladding 12 is deposited (for example by chemical vapour deposition) adjacent to the first waveguide 10 to the same height as the first waveguide 10, such that the upper surfaces of the first cladding 12 and the first waveguide 10 form a planar surface. An intermediary layer 15 is then deposited on the planar surface formed by the upper surfaces of the first cladding 12 and the first waveguide 10. The intermediary layer 15 is formed of silicon oxide. The intermediary layer 15 is at most 100 nm tall (i.e. as measured from the top of the first waveguide 10 to the bottom of the second waveguide 20).

Next, a second layer is deposited on the intermediary layer 15, and a second mask is applied to the second layer. If the first layer is formed of crystalline silicon, then the second layer is formed of amorphous silicon, and vice versa. The second mask is dimensioned so as to cover a portion of the second layer corresponding to the desired shape of the second waveguide 20. A second etch is then performed to produce the second waveguide 20, which includes a tapered portion 35. The tapered portion 35 extends between a non-tapered portion 34 and a narrowed portion 36 of the second waveguide 20. The transverse width of the tapered portion 30 decreases in a first direction along a length of the photonic module 1, whereas the transverse width of the tapered portion 35 decreases in an opposite direction to that of the first direction. As such, the narrowed portion 31 of the first waveguide is aligned with the non-tapered portion 34 of the second waveguide, and the narrowed portion 36 of the second waveguide is aligned with the non-tapered portion 29 of the first waveguide. Accordingly, the coupling section 25 comprises the tapered portion 30 of the first waveguide and the tapered portion 35 of the second waveguide. An anisotropic etch may be used when performing the second etch.

A second cladding 22 is deposited adjacent to the second waveguide 20 to the same height as the second waveguide 20, such that the upper surfaces of the second cladding 22 and second waveguide 20 form a planar surface. An additional silicon dioxide cladding layer 28 is deposited on the planar surface formed by the upper surfaces of the second cladding 22 and the second waveguide 20.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

LIST OF FEATURES

1: Photonic module
5: Substrate
7: Buried oxide, BOX, layer
8: Silicon device layer
10: First waveguide
12: First cladding
15: Intermediary layer
20: Second waveguide
22: Second cladding
25: Coupling section
29: Non-tapered portion of the first waveguide
30: Tapered portion of the first waveguide
31: Narrowed portion of the first waveguide
34: Non-tapered portion of the second waveguide
35: Tapered portion of the second waveguide
36: Narrowed portion of the second waveguide
38: Additional silicon dioxide cladding
40: Component
42: Third waveguide
43: Second coupling section
45: Crossing waveguide
46: First end of crossing waveguide
47: Second end of crossing waveguide
50: MZI
55: MZI arm
60: AWG
65: AWG output/input waveguide

The invention claimed is:
1. A photonic component comprising:
a photonic module, comprising:
- a substrate defining a horizontal plane and comprising a silicon layer and a buried oxide (BOX) layer directly on the silicon layer;
- a first waveguide above the substrate;
- a second waveguide, disposed above the first waveguide on an opposing side of the first waveguide to the substrate;
- a third waveguide above the substrate, the second waveguide being disposed above the third waveguide on an opposing side of the third waveguide to the substrate, the second waveguide being optically coupled between the first and third waveguides;
- a first coupling section configured to couple light between the first waveguide and the second waveguide and comprising:
  - a tapered portion of the first waveguide, tapering from a first width to a second width along a first direction, and
  - a first tapered portion of the second waveguide, tapering from a first width to a second width along a second direction antiparallel to the first direction; and
- a second coupling section configured to couple light between the second waveguide and the third waveguide and comprising:
  - a second tapered portion of the second waveguide, tapering from a first width to a second width along a third direction, and
  - a tapered portion of the third waveguide, tapering from a first width to a second width along a fourth direction antiparallel to the third direction; and
one or more crossing waveguides, a portion of the or each crossing waveguide being located between the second waveguide and the substrate,
wherein the or each crossing waveguide is optically insulated from the waveguides of the photonic module, wherein:
- the first waveguide and the third waveguide are each formed of crystalline silicon and the second waveguide is formed of amorphous silicon; or
- the first waveguide and the third waveguide are each formed of amorphous silicon and the second waveguide is formed of crystalline silicon,
wherein the first and third waveguides are directly on the BOX layer, and the second waveguide is directly on the first and third waveguides, and
wherein the portion of a first crossing waveguide of the one or more crossing waveguides that extends between the second waveguide and the substrate extends along a direction that forms a non-zero and non-perpendicular angle relative to a longitudinal axis of the second waveguide.

2. The photonic component of claim 1, further comprising a first cladding disposed so as to at least partially surround the first waveguide and a second cladding disposed so as to at least partially surround the second waveguide.

3. The photonic component of claim 2, wherein the first cladding and the second cladding are formed of silicon dioxide.

4. The photonic component of claim 1, wherein a length of the first coupling section is greater than:
- a maximum transverse width of the first waveguide; and
- a maximum transverse width of the second waveguide.

5. The photonic component of claim 4, wherein the length of the first coupling section is at least 4 µm but no more than 10 µm, and the maximum transverse widths are at least 2 µm but not more than 4 µm.

6. The photonic component of claim 1, wherein the first and third waveguides are formed of crystalline silicon and the second waveguide is formed of amorphous silicon.

7. The photonic component of claim 1, wherein the first and third waveguides are formed of amorphous silicon and the second waveguide is formed of crystalline silicon.

8. A method of fabricating the photonic component of claim 1, the method including:
- performing a first etching process on a first layer to form the first waveguide;
- depositing a second layer on an opposing side of the first waveguide to the substrate; and
- performing a second etching process on the second layer to form the second waveguide, wherein:
- the steps of performing the first etching process and/or the second etching process also form the first coupling section for coupling light between the first waveguide and the second waveguide,
- one of the first layer and the second layer is formed of crystalline silicon, and
- the other of the first layer and the second layer is formed of amorphous silicon.

9. The method of claim 8, wherein the step of performing the first etching process forms the tapered portion of the first waveguide, the first coupling section comprising the tapered portion of the first waveguide.

10. The method of claim 8, wherein the step of performing the second etching process forms the first tapered portion of the second waveguide, the first coupling section comprising the first tapered portion of the second waveguide.

11. The photonic component of claim 1, wherein the third direction is parallel to the first direction, and the fourth direction is parallel to the second direction.

12. A Mach-Zehnder interferometer comprising:
the photonic component of claim 1;
a first arm comprising the photonic module; and
a second arm.

13. An arrayed waveguide grating comprising:
the photonic component of claim 1; and
a plurality of arms,
wherein an arm of the plurality of arms comprises the photonic module.

* * * * *